United States Patent [19]  [11] 4,330,876
Johnson  [45] May 18, 1982

[54] SONAR SYSTEMS
[75] Inventor: Phillip L. M. Johnson, Yeovil, England
[73] Assignee: Plessey Overseas Limited, Ilford, England
[21] Appl. No.: 185,739
[22] Filed: Sep. 10, 1980
[30] Foreign Application Priority Data
Sep. 10, 1979 [GB] United Kingdom ................ 7931306
[51] Int. Cl.³ ............................................. G01S 15/06
[52] U.S. Cl. ................................ 367/105; 343/16 R; 367/8; 367/88
[58] Field of Search ...................... 367/8, 105, 88, 103; 343/16 R

[56] References Cited
U.S. PATENT DOCUMENTS
3,593,254  7/1971  Glenn, Jr. et al. .............. 367/105 X
3,887,923  6/1975  Hendrix ............................ 367/8 X
4,034,376  7/1977  Barton .............................. 343/16 R FOREIGN PATENT DOCUMENTS
1266260  3/1972  United Kingdom .
1316906  5/1973  United Kingdom .
1317553  5/1973  United Kingdom .
1542164  3/1979  United Kingdom .
2027885  2/1980  United Kingdom .

Primary Examiner—Richard A. Farley
Attorney, Agent, or Firm—Fleit & Jacobson

[57] ABSTRACT

A sonar bearing determining system comprises a generator for radiating a sonar signal and a receiver for receiving echo signals. The receiver comprises an array of spaced receiving transducers and a modulating and sampling arrangement which consists of a multiplexer driven by a clock signal for producing a combined signal. The combined signal is of the form of a repetitive sequential sample of each of the received signals modulated by a signal equal to the multiplexing signal but phase displaced relative thereto. A bearing determining device is arranged to determine the bearing of an object providing an echo in dependence upon the frequency component of the combined signal or in dependence upon the time displacement of the combined signal relative to a predetermined time value. The modulating and sampling means is arranged to route selectively samples of each of the received signals and thereby to effect both modulating and sampling functions.

15 Claims, 9 Drawing Figures

SONAR SYSTEMS

BACKGROUND OF THE INVENTION

This invention relates to sonar systems and more particularly to sonar systems for bearing determination of objects which reflect sonar energy.

SUMMARY OF THE INVENTION

According to one aspect of the invention, there is provided a sonar bearing determining system, comprising generating means for radiating a sonar signal, receiving means comprising an array of spaced receiving transducers, modulating and sampling means which consists of a multiplexer driven by a clock signal for producing a combined signal which is of the form of a repetitive sequential sample of each of the received signals modulated by a signal equal to the multiplexing frequency but phase displaced relative thereto, and means for determining from the combined signal a bearing indication in dependence upon the frequency component of the combined signal, wherein the multiplexer is arranged to route selectively samples of each of the received signals in turn to form said combined signal and thereby to effect both modulating and sampling functions.

According to another aspect of the invention there is provided a sonar bearing determining system, comprising generating means for radiating a sonar signal, receiving means comprising an array of spaced receiving transducers, modulating and sampling means which consists of a multiplexer driven by a clock signal for producing a combined signal which is of the form of a repetitive sequential sample of each of the received signals modulated by a signal equal to the multiplexing frequency but phase displaced relative thereto, and means for determining from the combined signal a bearing indication in dependence upon the time displacement of the signal relative to a predetermined time value, wherein the multiplexer is arranged to route selectively samples of each of the received signals in turn to form said combined signal, and thereby to effect both modulating and sampling functions.

BRIEF DESCRIPTION OF THE DRAWINGS

In order that the invention and its various other preferred features may be understood more easily, some embodiments of the invention will now be described, by way of example only, with reference to the schematic drawings, in which.

DESCRIPTION OF THE PREFERRED EMBODIMENTS

Figure 1:
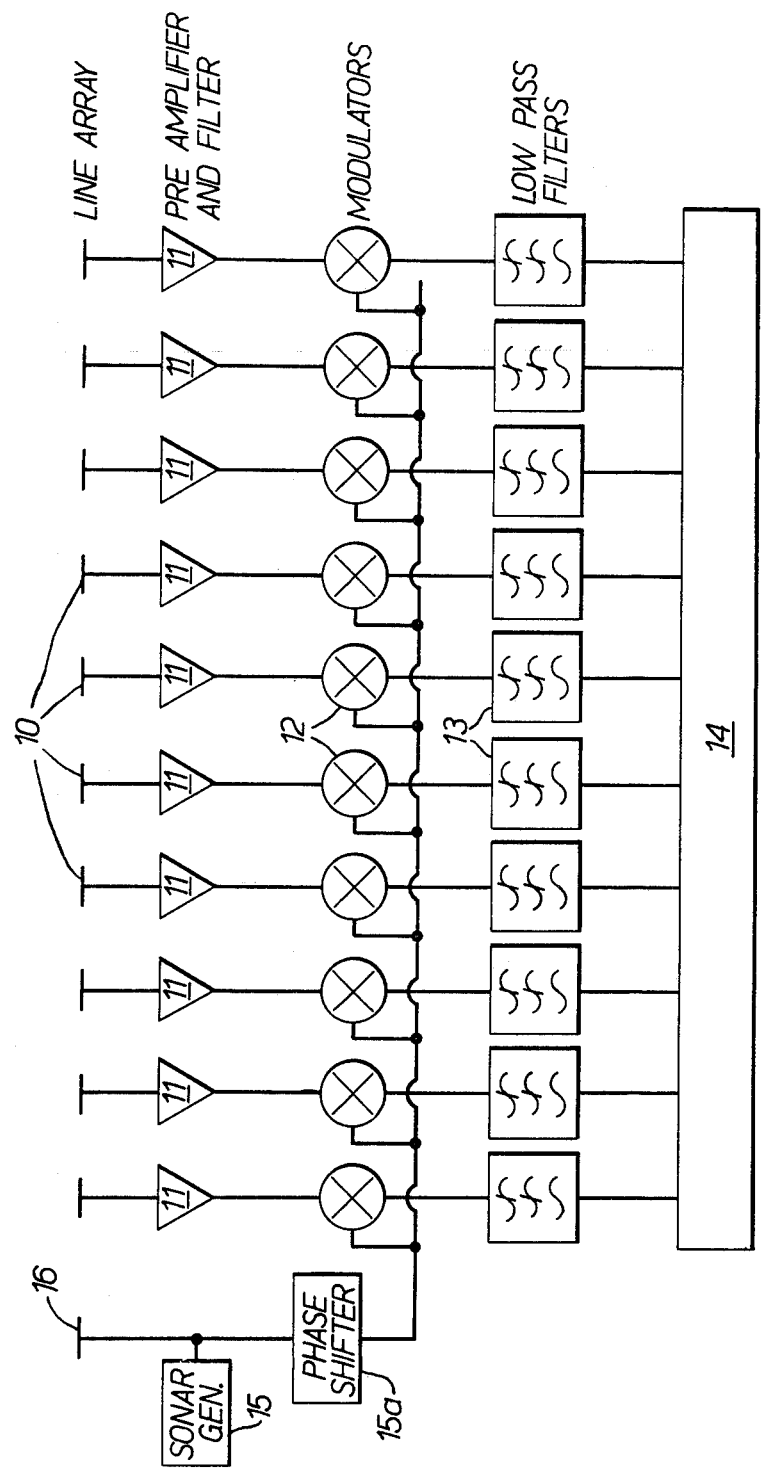
FIG. 1 is a block diagram for illustrating the holographic sonar principle.

In the drawings blocks performing identical functions are given the same reference numerals.

Holography in the optical sense is a well defined concept in that the hologram is generated by the interference of the wavefront of interest and a reference wavefront. Both wavefronts are derived from the same source and therefore maintain phase and frequency integrity. The resulting interference pattern is called a hologram and does not change with time. This hologram is recorded on a transparency and Fourier transformed, using a lens, to form an image.

This same system can be reproduced acoustically with some practical simplifications as will now be described with reference to FIG. 1. FIG. 1 shows a line array of sonar transducers 10 each coupled by an individual preamplifier and filter 11, modulator 12 and low pass filter 13 thereby forming several receiving channels the outputs of which are fed to a conventional beamforming device 14. The modulators are each fed by a sonar frequency generator 15 via a phase shifter 15a. The generator 15 also feeds a transmitting transducer 16. The line array receives transmitted sonar signals after reflection from an object.

Figure 2:
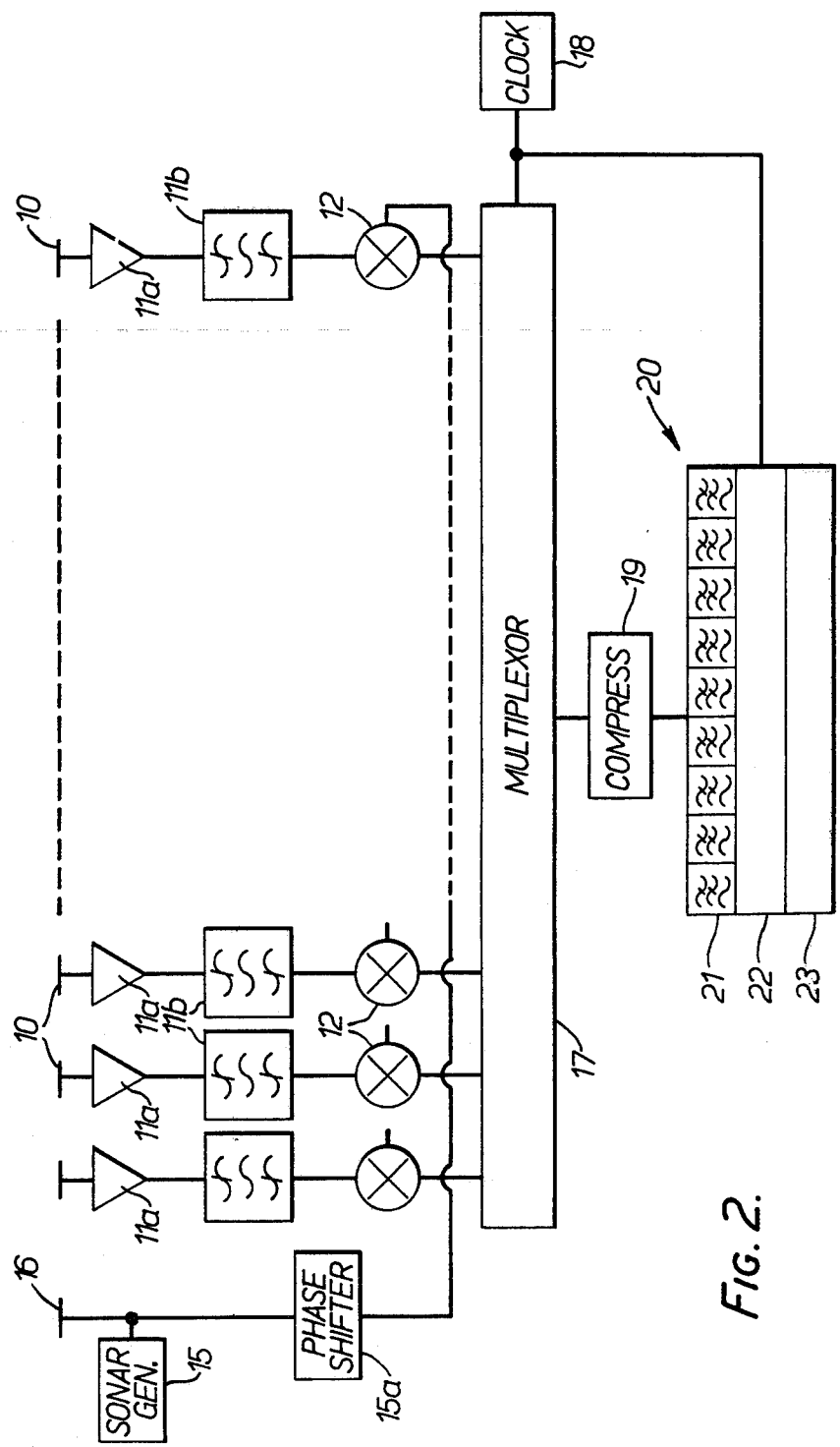
FIG. 2 is a block diagram of a basic sonar bearing determining system employing a line array of spaced receiving transducers.

The arrangement of FIG. 1 generates a reference waveform electronically in the sonar generator 15 and phase shifter 15a. The outputs from the filters 13 form an electrical equivalent of an optical hologram and a Fourier transform process may be completed by using a conventional beamformer 14. Clearly such a system is more complex than conventional systems. However, if the outputs from each of the channels are sampled sequentially, the interference pattern is transferred from a special hologram to a time domain hologram and the Fourier transform may be carried out in the time/frequency domain using a spectrum analyser and the difference frequency varies as a function of the bearing of an object reflecting the sonar signal. Such a system is shown in FIG. 2. There the output of each receiving transducer 10 is fed via a preamplifier 11a and filter 11b to a modulator 12 fed with the sonar signal as a modulating frequency. Each of the modulators is fed to a different input of a multiplexer 17 driven by a clock generator 18. The output of the multiplexer is fed over a single line via a dynamic range compressor 19, which may be a time varied gain or reverberation gain control, to a spectrum analyser 20.

As can be seen the spectrum analyser comprises a bank of filters 21 the outputs of which are fed via a video multiplexer 22 to a video display device 23. The multiplexer 22 is conveniently driven from the clock 18 but could be driven at a different frequency to the multiplexer 17. The filters 21 can conveniently comprise charge coupled device filters.

The relationship between the difference frequency and the bearing can be seen from the mathematical derivation at the end of this specification.

Figure 3:
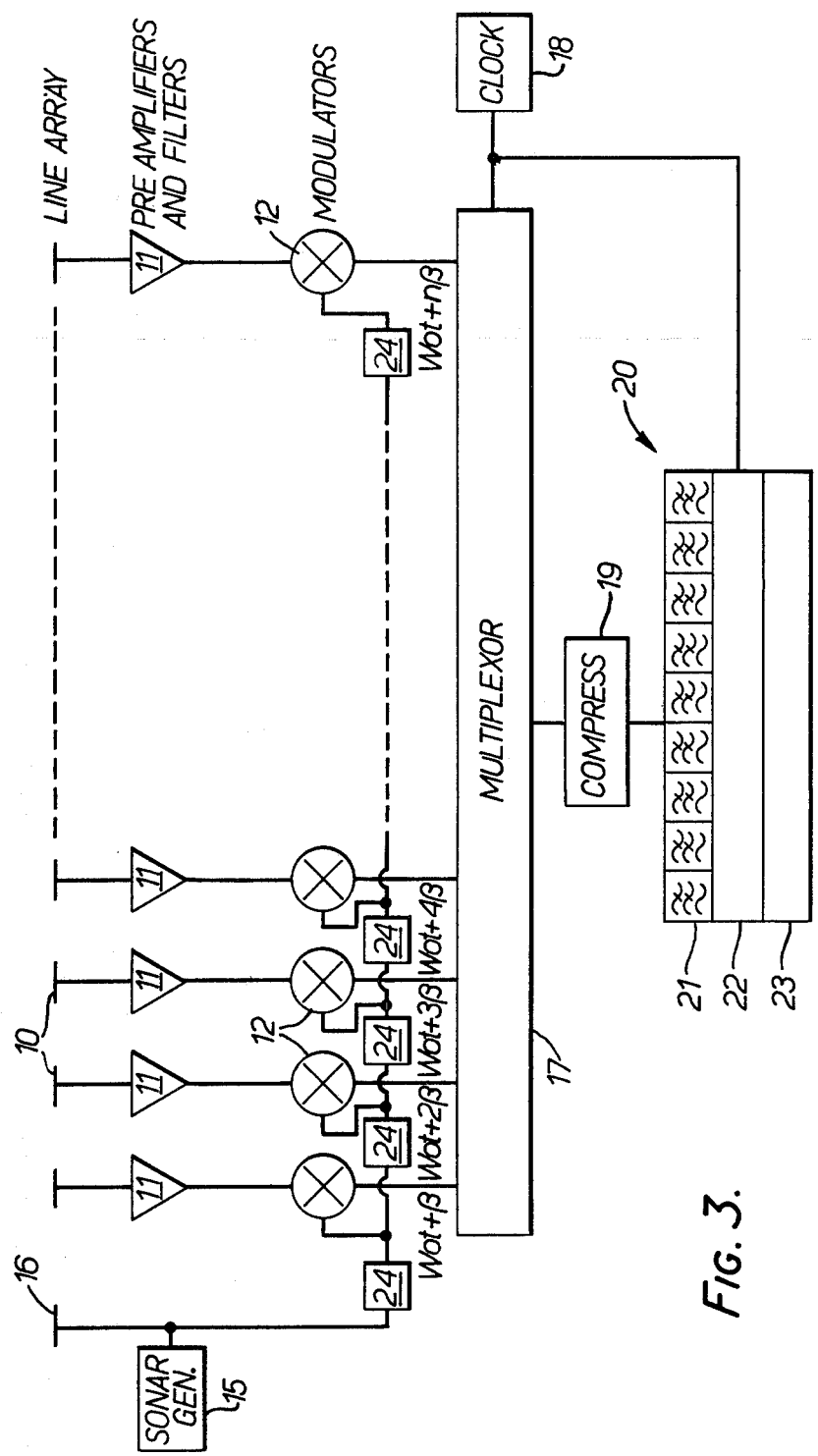
FIG. 3 is a block diagram of a sonar bearing determination system illustrating means for avoiding aliasing.
Figure 4:
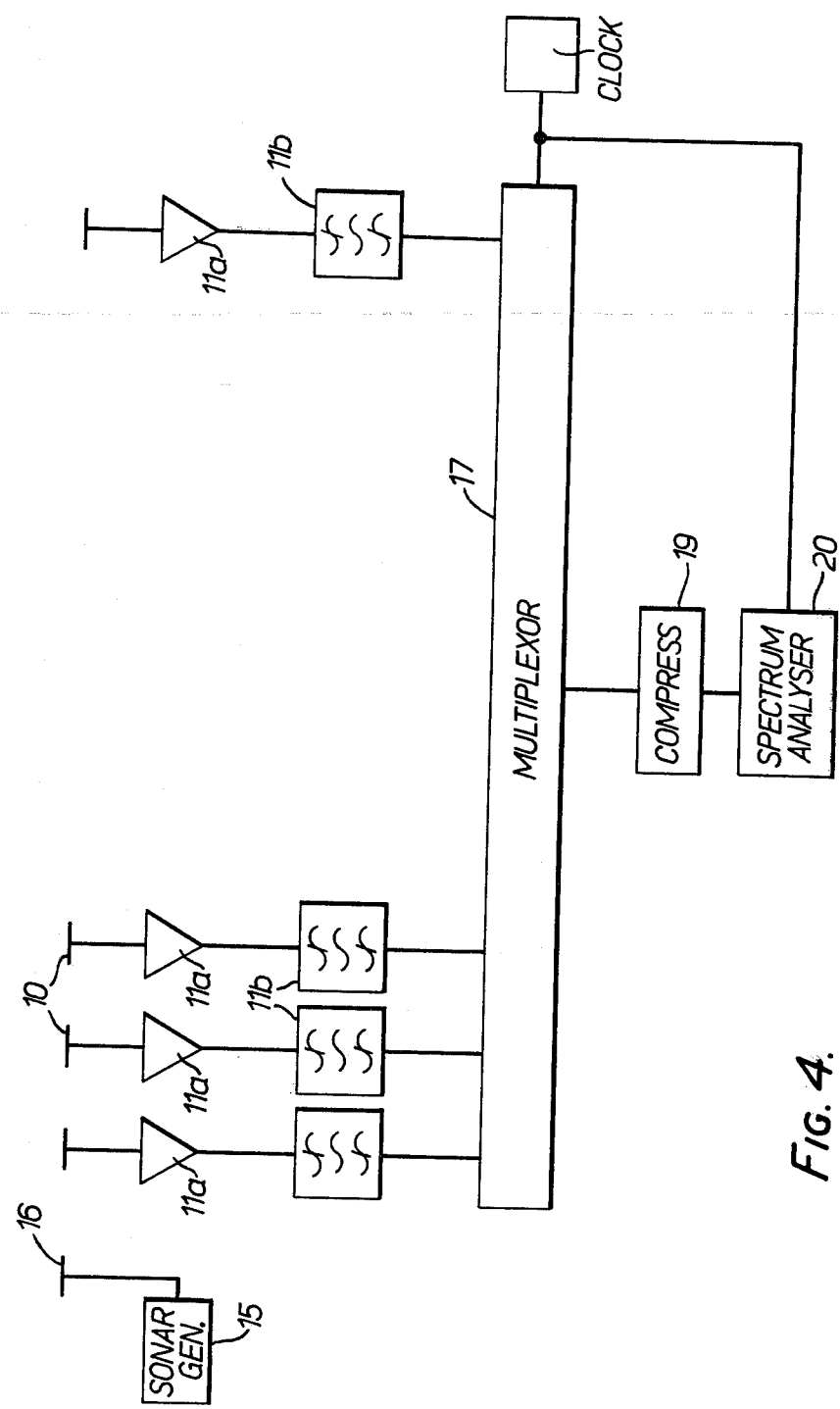
FIG. 4 is a block diagram of a simplified system constructed in accordance with the invention and having means for avoiding aliasing.

The arrangement of FIG. 2 provides the identical frequency component in respect of reflecting objects displaced by the same distance to opposite sides of the central axis of the radiated sonar signal so that ambiguity or aliasing of the received signal can occur. This ambiguity can be resolved by any suitable means e.g. by comparing quadrature components of the holographic signal with in phase components. However, such a system is complex and far from ideal. A better way of avoiding aliasing is shown in the diagram of FIG. 3 from which it can be seen that the system of FIG. 2 is modified by introducing phase delay elements 24 between the modulators 12 so that the phase changes proportionately to the position of the related transducer across the array. The adding of a phase shift in this way is analogous to the introduction of oblique illumination in an optical holographic system. By sampling the outputs of the modulators as before the frequency resulting from an echo produced by an object disposed on the radiating axis of the transmitting transducer is not d.c. as in FIG. 2. Signals that are received from one side of the radiating axis cause a reduction in frequency whilst signals received from the other side cause an increase in frequency. Accordingly, by careful selection of phase the ambiguity can be removed. The system of FIG. 3 is still fairly complex but does have the advantage, as compared with conventional systems, that dynamic range compression can be applied to the signal prior to analysis of the combined signal. The present invention is based on a consideration of the operation of the arrangement of FIG. 3. The modulators used could be of a ring modulator type i.e. it is driven by a square wave and simply inverts the signal every half cycle. The phase differences between elements could be chosen to be $\pi$ radians. If the switching frequency of the multiplexer clock is derived from the same oscillator as the mixers then the phase will also be locked. Now, since the multiplexer shifts to the next sample at every half cycle and the mixer phase is inverted on alternate channels, then no phase change occurs. Consequently the mixers may be removed and the multiplexer may be used to both multiply, by the act of switching, and introduce a phase shift as a result of its sequential sampling. The whole holographic process may be replaced by the multiplexer. Clearly this results in a considerable simplification of the system. The simplified system of the present invention is shown in FIG. 4. The output from the multiplexer is the time domain hologram. The frequency corresponding to the on axis case is now the same as the acoustic value.

Since the hologram is formed at the output of the multiplexer all the information is on a single cable and can be compressed using an A.G.C. system before transmission up a tow cable. The spectrum analyser is kept on a towing vessel and the output is used to drive the display system.

In the qualitative description of the system operation given above it has been assumed that the clock frequency of the multiplexer is twice that of the acoustic frequency. With careful analysis it can be shown that this frequency is not critical and by suitably selecting certain frequencies for various conditions the generation of non diverging beams is possible.

A full analysis for this holographic approach is provided at the end of this specification.

The beam pattern for this holographic approach is defined in the frequency domain by the equations $$S(w)'' = \frac{A_o}{2} \cdot \frac{\sin \frac{1}{2} \alpha}{\frac{1}{2} \alpha} \quad (4)$$

$$\frac{\sin(w_o - w)\frac{T}{2}}{(w_o - w)\frac{T}{2}} \cdot \frac{\sin \frac{n}{2}((w_o - w)T + \alpha)}{\sin \frac{1}{2}((w_o - w)T + \alpha)}$$

where
 $\alpha = kb \sin \theta$
 $k$ = acoustic wave number
 $b$ = inter element spacing
 $\theta$ = angle of steer
 $T$ = multiplexer period (for one sample)
 $n$ = number of elements in the array
 $w_o$ = acoustic angular frequency There is also a second set of frequencies which are centred about a frequency of $-w_o$. If however the multiplexer period is made too short such that $w_o T > \pi$ the negative frequency spectrum continues into the positive frequency region and may give rise to ambiguity. The mathematical derivation at the end of this specification illustrates that the choice of clock frequency is not directly dependent on the acoustic frequency.

The video output is obtained by scanning the spectrum. The magnitude of the energy in a given band is effectively the Z modulation or the video signal whilst the scan corresponds to the bearing.

Figure 5:
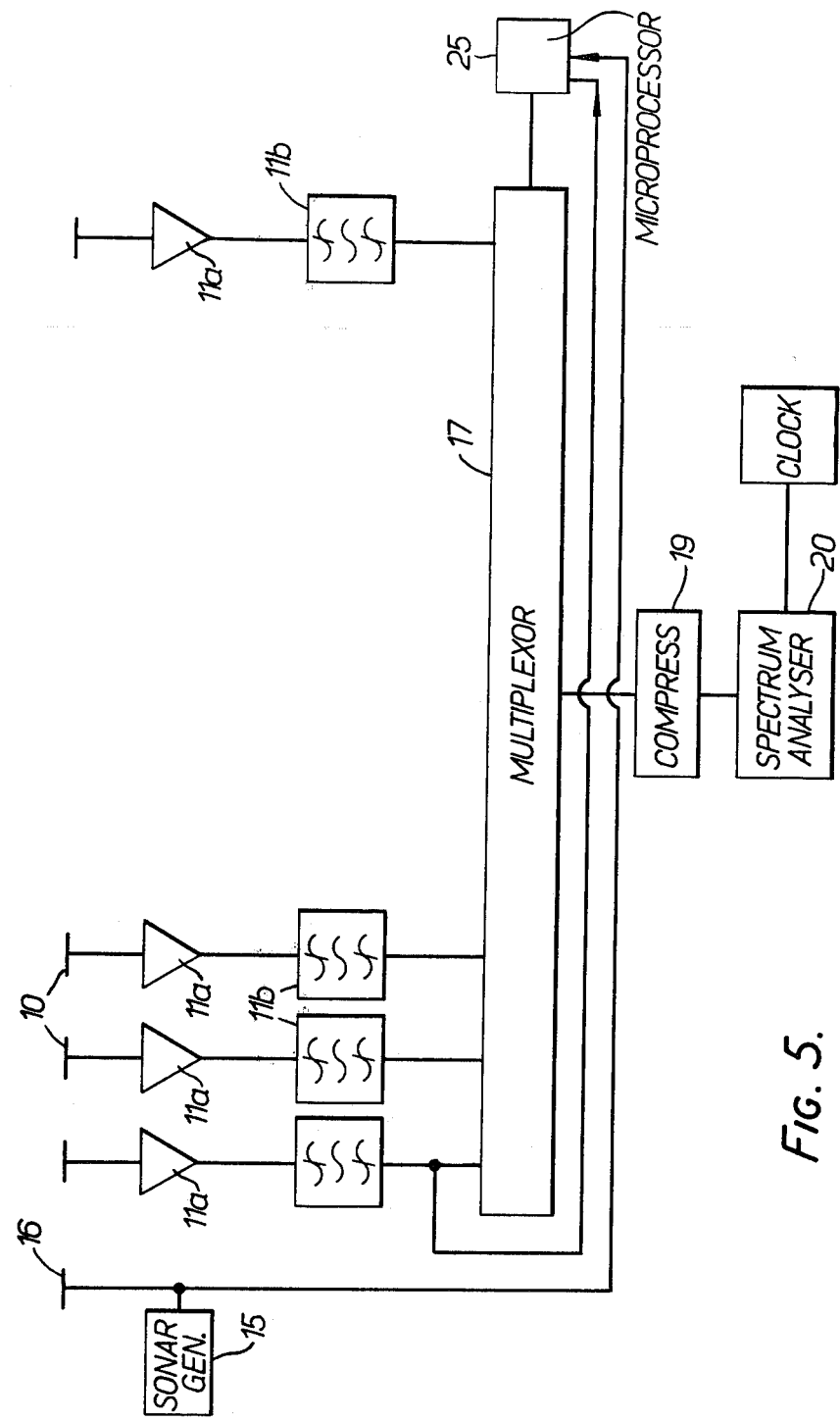
FIG. 5 is a block diagram of a system constructed in accordance with the invention and arranged to scan geometrically parallel beams.

It is desirable in side scan systems to use geometrically parallel beams rather than diverging beams. This may be achieved by switching out all but the centre element and then as the range increases more elements are switched into operation. The result is a time matched to the range divergence such that effectively parallel beams are produced. The holographic process lends itself favourably to this technique with no increase in bandwidth and only a small increase in hardware, namely the multiplexer clock. This device can be made in the form of a microprocessor programmed to change in frequency with respect to echo range by sensing the radiation of sonar "ping" and detecting receipt of that ping after reflection. Such an arrangement is shown in FIG. 5. The microprocessor is shown as 25.

Consider the equation of the output spectrum $$S(w) = F \cdot \frac{\sin(w_o - w)\frac{T}{2}}{(w_o - w)\frac{T}{2}} \cdot \frac{\sin \frac{n}{2}((w_o - w)T + \alpha)}{\sin \frac{1}{2}((w_o - w)T + \alpha)} \quad (5)$$

Figure 6:
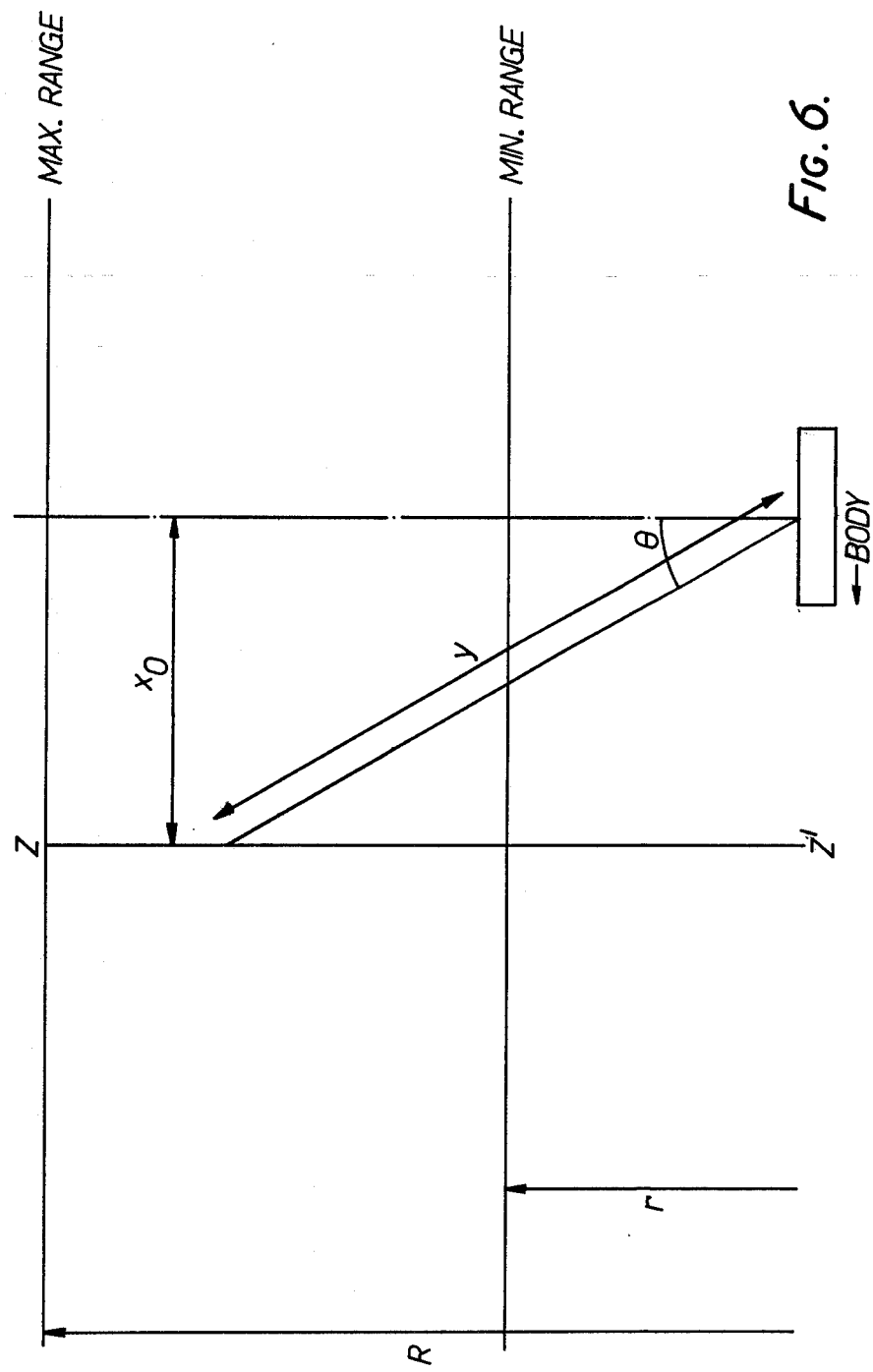
FIG. 6 is a pictorial representation showing the steer angle of the sonar system.

Now for a beam to track out from minimum range 'r' to maximum range 'R' along the line ZZ' as shown in FIG. 6, the amount by which the beam must steer is dependent upon range 'y' and lateral displacement x $\sin \theta = (x/y)$ and $\alpha = kb \sin \theta$ $\alpha = kb(x/y)$ The principal maxima for the steered beam occurs when:

$(w_o - w)T + \alpha = 0$ $(w - w_o)T = kb (x/y)$

Hence for any given value of x the frequency 'w' may be kept constant for all ranges provided that the multiplexing period 'T' varies inversely proportionately to range y. Alternatively the multiplexing frequency increases linearly with range.

Since T varies as (l/y), the product yT is a constant, hence for all ranges out to the diffraction limit the bandwidth $\Delta w$ corresponding to an along track resolution $\Delta x$ is a constant. The system can therefore track parallel beams using constant bandwidth filters simply by adjusting the clock frequency with respect to range.

It can also be seen that the bandwidth of the output spectrum is limited to $mw/2\pi$ where 'm' is the number of beams. Signals received from outside the area of interest can be rejected, using a simple filter after the multiplexer, which cannot be achieved in conventional beamformers. At short range the spectrum is very narrow due to the long multiplexing sample periods. The beam identifying bandwidth encompasses several beams and effectively sums then together, thereby maintaining the same linear resolution at short range as the diffraction limit permits at maximum range. As the range increases, the multiplexing sample period reduces thereby broadening the spectrum and reducing the number of beams encompassed by the beam identifying filter, until at maximum range only one beam occupies the filter bandwidth. At this point the diffraction limit of the aperture is reached and the beam will diverge at ranges greater than this, the design maximum.

It has been shown that the concept for the generation of parallel beams is possible without using more bandwidth than diverging beams on a conventional system. Furthermore the generation of the parallel beams is achieved simply by increasing the multiplexing frequency with range. The only trade off with this technique is that at close ranges the sample period necessary to sample the complete array may cause, in extreme cases, the pulses to be sufficiently long to degrade range resolution or pulse bandwidth.

In the previous description the assumption has been made that the incoming wavefront is plane, i.e. the echo arrives from the far field zone. In a practical system the array aperture is 800λ and for the worst case frequency this give the near field limit as 2333 m which is an order of magnitude greater than the maximum range. Giving the array a fixed focus at 180 m only gives a depth of focus of 30 m from 166 m to 196 m. It is evident therefore, that a dynamic focussing system should be employed. The holographic approach discussed earlier makes this surprisingly easy. The focussing control is again the multiplexer clock frequency. In this instance the clock frequency is adjusted during the scan period.

Figure 7:
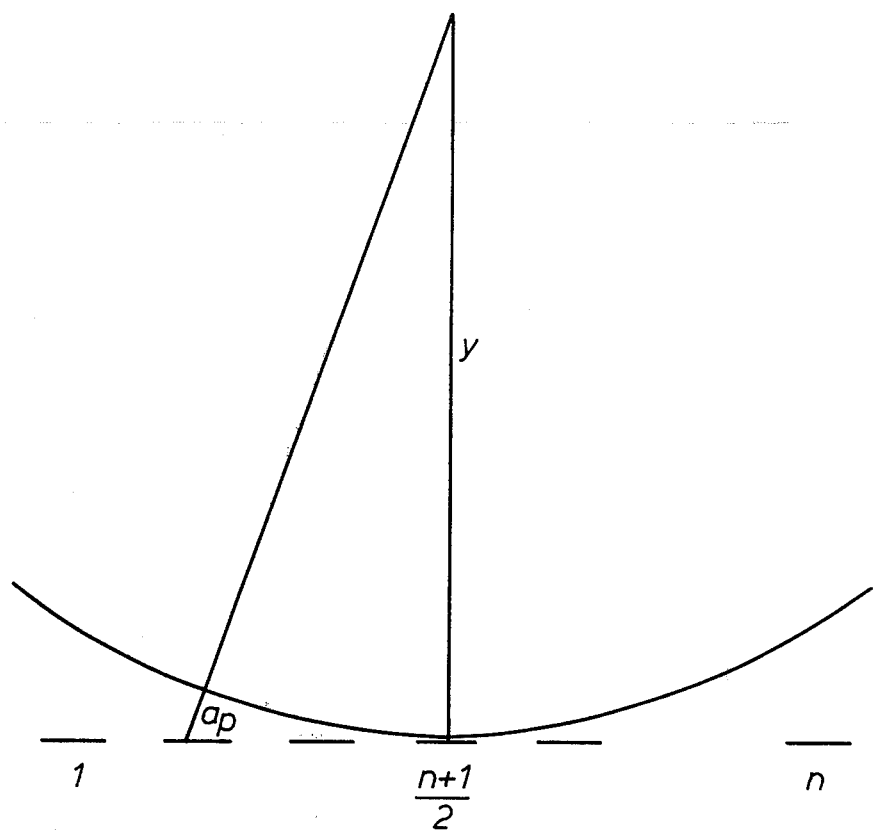
FIG. 7 is a pictorial representation illustrating path length difference between an outer and centre element of a receiving transducer array.

Consider the situation shown in FIG. 7. The difference in path for an echo reaching the centre element (n/2) and the pth element is 'Ap'. The value of Ap is given by the relation:

$$Ap \simeq \left(\left(\frac{n+1}{2}\right)^2 + (n+1)P + P^2\right)\frac{b^2}{2y} \tag{6}$$

The difference in path between elements p and p+1 is given by;

$$Ap - A_{p+1} = \frac{b^2}{2y} \cdot (n - 2P) = \Delta a \tag{7}$$

The equivalent time difference is:

$$\frac{\Delta a}{C} = \frac{b^2}{2yC} \cdot (n - 2P) \tag{8}$$

The multiplexer period should now be adjusted to compensate for the curve wavefront. The new multiplexer period is:

$$Tp = T - \frac{\Delta a}{C} \tag{9}$$

$$Tp = T + \frac{b^2}{2yC}(2P - n) \tag{10}$$

The focussing process is therefore produced by injecting linear period F.M. into the multiplexer address system. The magnitude of the deviation is inversely proportional to the echo range. The rate of change of frequency during the scan is reduced dynamically to compensate for longer range targets until in the far field only a constant clock rate exists.

Figure 8:
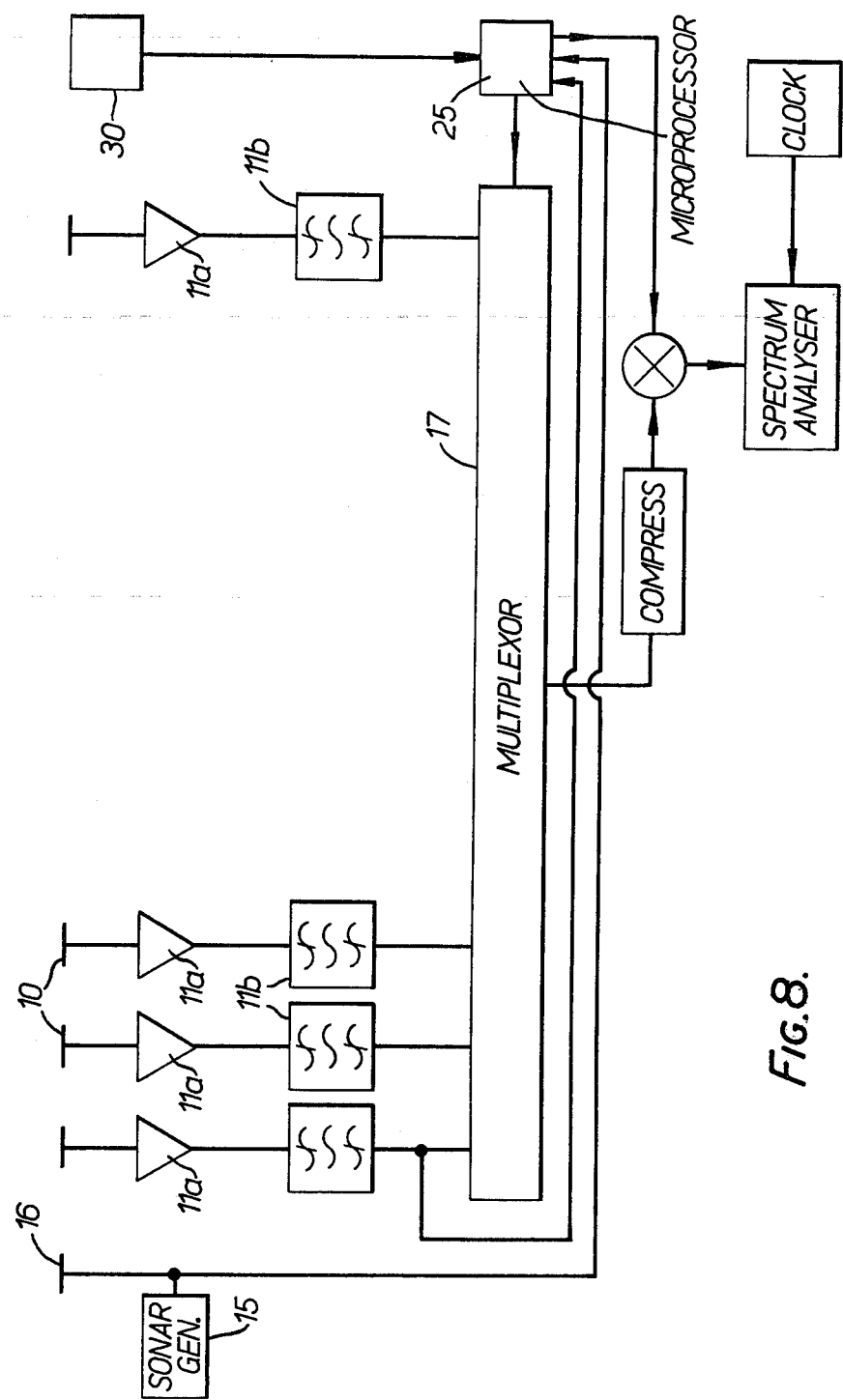
FIG. 8 is a block diagram of a system constructed in accordance with the invention and arranged to compensate for angular displacements of the sonar body.

If a sonar undergoes angular displacements in azimuth the electronically formed beam displaces by the same amount. This causes a breakdown in the picture integrity and makes the system difficult to operate. An arrangement which overcomes this problem is shown in FIG. 8.

Sensors 30 are positioned on the sonar body to monitor this angular displacement and therefore correct the beam position electronically. This technique requires that the sector be made larger to accommodate the stabilisation angles i.e. the amount by which stabilisation is needed.

If the transducer displaces in azimuth, then the instantaneous displacing angle is 0(t). This results in the output spectrum being shifted in frequency by an amount f(t) which for small angles is directly proportional to $\theta(t)$. Hence the angular displacement of the transducer is directly coupled to the output spectrum. If the transducer displacement is monitored then an appropriate correction to the position of the spectrum may be applied simply with the addition of a modulator 31 after the multiplexer system.

Figure 9:
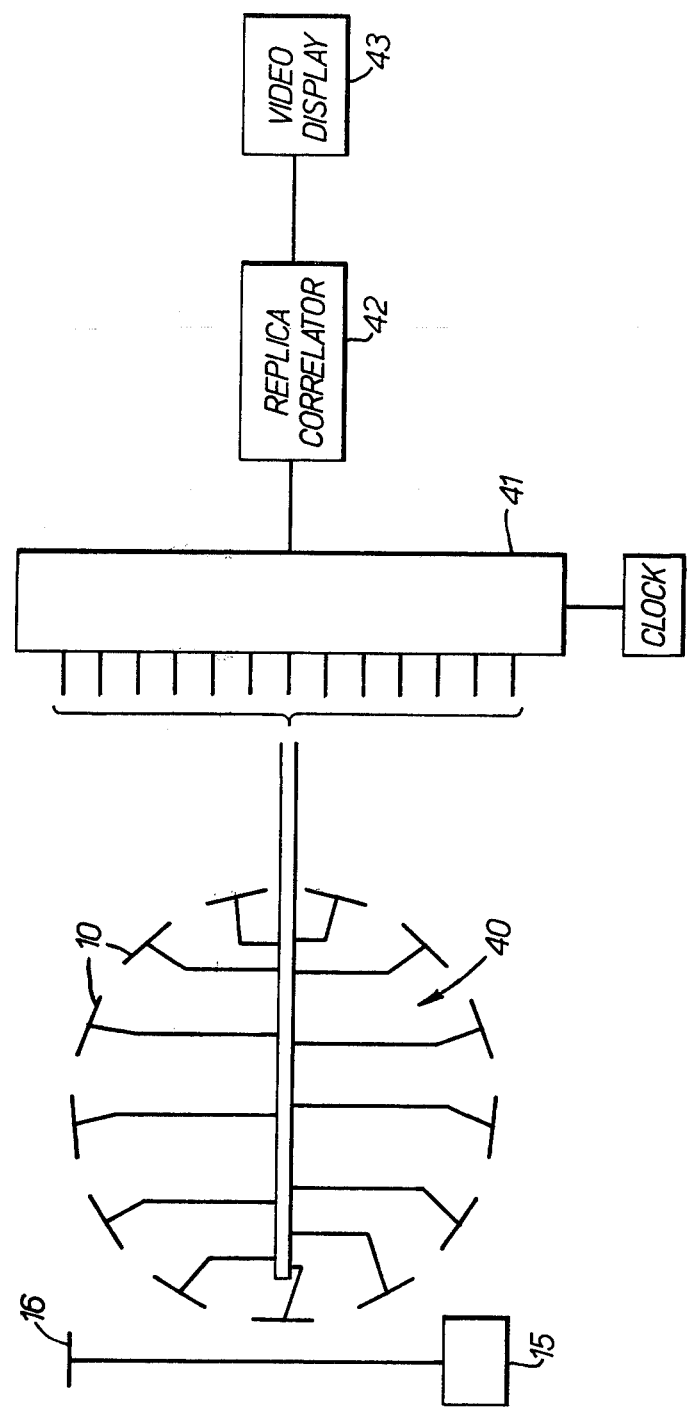
FIG. 9 is a block diagram of a system constructed in accordance with the invention which employs a circular receiving transducer array.

The arrangements so far described employ a line array of receiving transducers. However, a circular array of receiving transducers can be employed without departing from the basic concept of this invention. Such a system is shown in FIG. 9 and comprises a circular array 40 of transducers 10. The output of each transducer is fed to a commutating multiplexer 41 having a single output which is coupled to a replica correlator 42 which provides an output signal which feeds a video display device 43. The output frequency of the combined signal at the output of the multiplexer 41 has a constant frequency but is time displaced relative to a predetermined time value indicative of a known bearing value. The replica correlator in effect determines the time delay of the combined signal and provides a signal representative of the bearing for driving the video display.

The mathematical derivation referred to folows:

MATHEMATICAL EXPLANATION OF THE HOLOGRAPHIC SYSTEM CONCEPT

Consider a line array of η elements, the outputs of which are sampled sequentially. For a plane wave arriving at the transducer from an angle $\theta$ the output from the Pth element is given by:

$$O/Pp = A \cos(\omega_o t + \psi(p))$$

where
$\psi(p) = Pkb \sin\theta + \phi$
$\omega_o$ = acoustic angular frequency
$k$ = acoustic wave number
$b$ = inter element spacing The frequency content of the multiplexed signal is $$S(\omega) = \sum_{p=1}^{p=n} \frac{1}{T} \int_{(p-1)T}^{pT} A \cos(\omega_o t + \psi(p)) \exp -j\omega t \cdot dt$$

$$= \sum_{p=1}^{p=n} \frac{A}{2T} \int_{(p-1)T}^{pT} \exp \cdot j(\omega_o - \omega)t + \psi(p) +$$

$$\exp -j((\omega_o + \omega)t + \psi(p)) \cdot dt$$

where
$$\psi(p) = pkb \sin\theta + \phi$$
$$= \alpha p + \phi$$

T is the sample period.

$$S(\omega) = \sum_{p=1}^{p=n} \frac{A}{2T} \left| \frac{\exp \cdot j((\omega_o - \omega)t + \psi(p))}{j(\omega_o - \omega)} - \frac{\exp \cdot -j((\omega_o + \omega)t + \psi(p))}{j(\omega_o + \omega)} \right|_{(p-1)T}^{pT}$$

$$= \sum_{p=1}^{p=n} \frac{A}{2T} \left[ \frac{\exp \cdot j((\omega_o - \omega)PT + \psi(p))}{j(\omega_o - \omega)} - \frac{\exp j((\omega_o - \omega)PT + \psi(p) - (\omega_o - \omega)T)}{j(\omega_o - \omega)} - \right.$$

$$\left. \frac{\exp -j((\omega_o + \omega)PT + \psi(P))}{j(\omega_o + \omega)} + \frac{\exp -j((\omega_o + \omega)PT + \psi(P) - (\omega_o + \omega)T)}{j(\omega_o + \omega)} \right]$$

$$= \sum_{p=1}^{p=n} \frac{A}{2} \left[ \exp j((\omega_o - \omega)(P - \tfrac{1}{2})T + \psi(P)) \cdot \frac{\sin(\omega_o - \omega)\frac{T}{2}}{(\omega_o + \omega)\frac{T}{2}} + \right.$$

$$\left. \exp -j((\omega_o + \omega)(P - \tfrac{1}{2})T + \psi(P)) \cdot \frac{\sin(\omega_o + \omega)\frac{T}{2}}{(\omega_o + \omega)\frac{T}{2}} \right]$$

$$= \frac{A}{2} \exp j\left( (\omega_o - \omega)n\frac{T}{2} + \frac{(n+1)}{2}\alpha + \phi \right) \cdot \frac{\sin(\omega_o - \omega)\frac{T}{2}}{(\omega_o + \omega)\frac{T}{2}} \cdot \frac{\sin \frac{n}{2}((\omega_o - \omega)T + \alpha)}{\sin \frac{1}{2}((\omega_o + \omega)T + \alpha)} +$$

$$\frac{A}{2} \exp -j\left( (\omega_o + \omega)n\frac{T}{2} + \frac{n+1}{2} + \phi \right) \cdot \frac{\sin(\omega_o + \omega)\frac{T}{2}}{(\omega_o + \omega)\frac{T}{2}} \cdot \frac{\sin \frac{n}{2}((\omega_o + \omega)T + \alpha)}{\sin \frac{1}{2}((\omega_o + \omega)T + \alpha)}$$

The second term in this expression is associated with negative frequencies and may be neglected for this application. The exponential term is purely a value of phase and again this may be neglected. Hence for position frequencies the spectrum is:

$$S(\omega)' = \frac{A}{2} \cdot \frac{\sin(\omega_o - \omega)\frac{T}{2}}{(\omega_o - \omega)\frac{T}{2}} \cdot \frac{\sin \frac{n}{2}((\omega_o - \omega)T + \alpha)}{\sin \frac{1}{2}((\omega_o - \omega)T + \alpha)}$$

$$\alpha = kb \sin\theta$$

The spectrum looks similar in shape to the beam pattern of a line array of $\eta$ elements each separated by b.

The analysis given assumes that the elements have an omnidirectional receiving characteristic. However, in practice this is rarely the case. The response of an element of length b is given by:

$$A = A_o \frac{\sin \tfrac{1}{2} kb \sin\theta}{\tfrac{1}{2} kb \sin\theta}$$

$$= A_o \frac{\sin \tfrac{1}{2}\alpha}{\tfrac{1}{2}\alpha}$$

Hence the true spectrum is given by:

$$S(\omega)'' = \frac{A_o}{2} \cdot \frac{\sin \tfrac{1}{2}\alpha}{\tfrac{1}{2}\alpha} \cdot \frac{\sin(\omega_o - \omega)\frac{T}{2}}{(\omega_o - \omega)\frac{T}{2}} \cdot$$

$$\frac{\sin \frac{n}{2}((\omega_o - \omega)T + \alpha)}{\sin \frac{1}{2}((\omega_o - \omega)T + \alpha)}$$

The term $$\frac{\sin(\omega_o - \omega)\frac{T}{2}}{(\omega_o - \omega)\frac{T}{2}}$$

controls the envelope of the spectral pattern, the 3.9 dB point occurring when $$(\omega_o - \omega)\frac{T}{2} = \pm\frac{\pi}{2}$$

This condition limits the maximum and minimum acceptable frequencies corresponding to the maximum steer angles of the receiver beams.

The final term in the equation of the spectrum defines the position of the steered beam. The maxima occurs when:

$$\sin \tfrac{1}{2}(\omega_o - \omega)T + \alpha = q\pi$$

where q is an integer.

The first maxima occurs when q=0 hence $(\omega_o-\omega) = -\alpha_o$

It has already been shown that at the −3.9 dB points $$(\omega_o - \omega)\frac{T}{2} = \frac{\pi}{2}.$$

$$\alpha_o = \mp\pi$$

But $\alpha_o = kb \sin \theta_o$ $$\therefore \sin \theta_o = \tfrac{1}{2}\lambda/b$$

It can be seen that the edge of the sector is defined purely by the physical dimensions and the acoustic wavelength. It is totally independent of the multiplexing frequency. It is interesting to note that this occurs at exactly the same point as the diffraction limit imposed by the element dimension 'b'. Since this situation occurs the sector envelope behaves as a $\sin e^2$ function and not as a simple sine function. This results in a more rapid fall off in amplitude with respect to bearing. The on axis beamwidth to the −3.9 dB points is given by the bandwidth corresponding to (1/nT) or the period necessary to sample the whole array. The same frequency shift occurs when the beam is steered through $\pm\sin^{-1} \tfrac{1}{2}\cdot\lambda/nb$ which is the same as that for a conventional beamformer.

The holographic system behaves essentially the same as a conventional system except that the envelope, or sector, causes a more rapid cut off at the extremities of the sector. The multiplexing frequency is not tightly controlled, slow multiplexing prevents an overlap from the negative frequency spectrum but results in a long scan period and narrow band filters on the spectrum analyser. This in turn degrades range resolution and makes the system more susceptible to doppler effects.

It will be understood that the above description of the present invention is susceptible to various modifications, changes and adaptations.

I claim:

1. A sonar bearing determining system, comprising generating means for generating and radiating a sonar signal, receiving means comprising an array of spaced receiving transducers for receiving the sonar signal, modulating and sampling means comprising a multiplexer driven by a clock signal for multiplexing in accordance with a multiplexing frequency to produce a combined signal having a frequency component and being of the form of a repetitive sequential sample of each of the received signals modulated by a signal equal to the multiplexing frequency but phase displaced relative thereto, and determining means for determining, from the combined signal, a bearing indication in dependence upon the frequency component of the combined signal, wherein the multiplexer is arranged to selectively route samples of each of the received signals in turn to form said combined signal, whereby to effect both modulating and sampling functions.

2. A system as claimed in claim 1, including means for sensing the time interval between radiation of a sonar signal and receipt of an echo by one of the transducers and means responsive thereto for increasing the clock frequency in dependence upon the time interval to define a substantially spacially parallel beamed side scan.

3. A system as claimed in claim 1 including means for sensing the time difference between receipt of an echo by two of the transducers and means for frequency modulating the clock frequency in dependence thereupon thereby to "focus" the array when receiving non plane wave fronts.

4. A system as claimed in any one of claims 2 or 3, comprising means for sensing angular displacement of the transducer array and for generating a correction frequency for the combined signal, and modulating means for receiving the combined signal and the correction frequency for providing a corrected output signal which is compensated for the angular displacement.

5. A system as claimed in any one of claims 1, 2 or 3 wherein the receiving transducers form a line array and the frequency component of the combined signal is determined by a spectrum analyser.

6. A system as claimed in claim 5, wherein the spectrum analyser comprises a parallel filter bank, having a common input and a common output, and a video multiplexer coupled with said common output for providing a video output signal representative of the bearing.

7. A system as claimed in claim 6, including a dynamic range compressor, prior to the filter bank, which is effective to compress the combined signal.

8. A system as claimed in claim 4, wherein the means for determining the bearing indication from the combined signal is remotely coupled with the rest of the system and the rest of the system is installed in a housing forming a towable body sonar.

9. A system as claimed in claim 4, wherein the receiving transducers form a line array and the frequency component of the combined signal is determined by a spectrum analyzer.

10. A sonar bearing determining system, comprising generating means for radiating a sonar signal, receiving means comprising an array of spaced receiving transducers for receiving the sonar signal, modulating and sampling means comprising a multiplexer driven by a clock signal for multiplexing in accordance with a multiplexing frequency to produce a combined signal having a frequency component and being of the form of a repetitive sequential sample of each of the received signals modulated by a signal equal to the multiplexing frequency but phase displaced relative thereto, and determining means for determining, from the combined signal, a bearing indication in dependence upon the time displacement of the combined signal relative to a predetermined time value, wherein the multiplexer is arranged to selectively route samples of each of the received signals in turn to form said combined signal, whereby to effect both modulating and sampling functions.

11. A system as claimed in claim 10, wherein the receiving transducers form a circular array and the time displacement of the combined signal relative to a predetermined value is determined by means of a replica correlator.

12. A system as claimed in any one of claims 1, 10, 2, 3, or 11, wherein the means for determining the bearing indication from the combined signal is remotely coupled with the rest of the system and the rest of the system is installed in a housing forming a towable body sonar.

13. A system as claimed in claim 11, including a dynamic range compressor, prior to the replica correlator, for compressing the combined signal.

14. A system as claimed in claim 12, wherein the receiving transducers form a line array and the frequency component of the combined signal is determined by a spectrum analyzer.

15. A system as claimed in any one of claims 1 or 10, wherein the clock frequency is equal to twice the frequency of the radiated sonar signal.

* * * * *